United States Patent [19]

Cheung et al.

[11] Patent Number: 4,892,768

[45] Date of Patent: * Jan. 9, 1990

[54] THERMOPLASTIC STRAP WITH MULTIPLE MATERIAL STRUCTURE AND WELD PRODUCED THEREWITH

[75] Inventors: Nelson Cheung, Hoffman Estates; Russell J. Gould, Mt. Prospect; Manuel C. Enriquez, Morton Grove, all of Ill.

[73] Assignee: Signode Corporation, Glenview, Ill.

[*] Notice: The portion of the term of this patent subsequent to Nov. 17, 2004 has been disclaimed.

[21] Appl. No.: 183,072

[22] Filed: Apr. 19, 1988

Related U.S. Application Data

[63] Continuation-in-part of Ser. No. 871,693, Jun. 6, 1986, Pat. No. 4,776,905.

[51] Int. Cl.⁴ .............................................. B32B 5/18
[52] U.S. Cl. .................................. 428/57; 428/310.5; 428/314.8; 428/317.5
[58] Field of Search ...................... 428/57, 220, 310.5, 428/314.8, 317.5

[56] References Cited

U.S. PATENT DOCUMENTS

| Re. 31,353 | 8/1983 | Cheung | 428/57 |
|---|---|---|---|
| 3,331,312 | 7/1967 | Leslie et al. | 156/73.5 |
| 3,442,203 | 5/1969 | Kobiella | 156/73.5 |
| 3,442,732 | 5/1969 | Stensaker et al. | 156/73.5 |
| 3,442,733 | 5/1969 | Vilcins | 156/73.5 |
| 3,442,734 | 5/1969 | Ericsson | 156/73.5 |
| 3,442,735 | 5/1969 | Stensaker | 156/73.5 |
| 3,548,740 | 12/1970 | Kobiella | 100/28 |
| 3,554,845 | 1/1971 | Billett et al. | 156/73.5 |
| 3,554,846 | 1/1971 | Billett | 156/73.5 |
| 3,561,350 | 2/1971 | Dorney et al. | 100/29 |
| 3,586,572 | 6/1971 | Ericsson | 156/73.5 |
| 3,669,799 | 6/1972 | Vilcins et al. | 156/73.5 |
| 3,799,835 | 3/1974 | Gilmore | 156/73.5 |
| 3,984,278 | 10/1976 | Styner et al. | 156/522 |

(List continued on next page.)

FOREIGN PATENT DOCUMENTS 49-4520 2/1974 Japan.

OTHER PUBLICATIONS

Article entitled, "Strapping Welded by Friction" published in *The Iron Age*, Jul. 7, 1966, on p. 72.

"Operation, Parts and Safety Manual Signode Spirit TM Strapping Machine" published by Signode Corporation, 2600 West Lake Avenue, Glenview, Illinois, 60025, under the designation 286022 Copyright © SIGNODE CORP., 8/85.

Freres, Robert N., "Fabricating with Friction Heat," *Modern Plastics*, pp. 142–144, Nov. 1943.

Asnisimova, A. P. and R. I. Zakson, "The Vibro-Friction Welding of Plastics," *Svar. Proiz.*, 1964, No. 8, pp. 23–24 (English pp. 45–48).

Primary Examiner—Alexander S. Thomas
Attorney, Agent, or Firm—Dressler, Goldsmith, Shore, Sutker & Milnamow, Ltd.

[57] ABSTRACT

A length of thermoplastic strapping is provided for use as strap disposed in a loop around an article so that overlapping strap portions are arranged in a face-to-face relationship, and an improved welded joint from such strapping is also provided. The weld includes at least part of the thickness of each strap portion forming a resolidified region from a fused state after application of heat. The resolidified region includes a solid phase of the first material and a plurality of discrete volumes defined in the resolidified region from which the first material is absent and which are distributed in the first material across the width and thickness of the resolidified region at least adjacent each end of the resolidified region. The strapping has a first layer including a first material and a second material carried by the first material. The second material effects the creation of the plurality of discrete volumes in the first material in the solidified region as a result of the application of heat and subsequent resolidification.

8 Claims, 2 Drawing Sheets

U.S. PATENT DOCUMENTS

| | | | |
|---|---|---|---|
| 3,996,403 | 12/1976 | Gould et al. | 428/198 |
| 4,050,372 | 9/1972 | Kobiella | 156/73.5 |
| 4,062,278 | 12/1978 | Cheung | 156/73.5 |
| 4,119,449 | 10/1978 | Gould | 156/73.5 |
| 4,153,499 | 5/1979 | Annis | 100/27 |
| 4,158,711 | 6/1979 | Gould | 428/57 |
| 4,247,591 | 1/1981 | Gould | 428/212 |
| 4,300,976 | 11/1981 | Wehr | 156/502 |
| 4,305,774 | 12/1981 | Wedeking | 156/73.5 |
| 4,313,779 | 2/1982 | Nix | 156/361 |
| 4,378,262 | 3/1983 | Annis | 156/73.5 |
| 4,450,032 | 5/1984 | Wehr | 156/353 |
| 4,479,834 | 10/1984 | Kobiella | 156/73.5 |
| 4,482,421 | 11/1984 | Gurak | 156/580.1 |
| 4,483,438 | 11/1984 | Kobiella | 206/83.5 |
| 4,512,844 | 4/1985 | Kobiella | 156/73.5 |
| 4,559,767 | 8/1983 | Cheung | 428/57 |

THERMOPLASTIC STRAP WITH MULTIPLE MATERIAL STRUCTURE AND WELD PRODUCED THEREWITH

CROSS-REFERENCE TO RELATED APPLICATION

This application is a continuation-in-part application of the copending and commonly assigned U.S. patent application Ser. No. 871,693 of Nelson Cheung and Robert J. Kobiella, now U.S. Pat. No. 4,776,905, which is entitled "Method And Apparatus For Producing A Welded Joint In Thermoplastic Strap," which was filed June 6, 1986, and which is incorporated herein by reference thereto.

TECHNICAL FIELD

This invention relates to thermoplastic strapping and to a weld for securing together the overlapping portions of the thermoplastic strapping.

BACKGROUND OF THE INVENTION AND TECHNICAL PROBLEMS POSED BY THE PRIOR ART

A variety of processes have been marketed and/or proposed over the years for welding together overlapping portions of a tensioned loop of thermoplastic strap encircling an article. One process employs a heated member to melt a surface layer of each of the strap portions which are then pressed together while the layers merge and cool to form a solidified weld or welded joint. (In the context of this subject matter, the terms "joint," "weld," and "welded joint" are conventionally used interchangeably.)

In a different process, the strap portions are pressed together, and a layer of each strap portion at the interface is melted by means of ultrasonic energy. The layers then cool and solidify while the overlapping strap portions remain pressed together.

Another process is effected by first pressing the overlapping strap portions together and then creating a unidirectional or multidirectional bodily sliding frictional movement between the contacting surfaces of the overlapping strap portions so as to melt the interface region of the overlapping stap portions. The melted interface region is allowed to solidify at rest, but under pressure, so as to bond the overlapping strap portions together.

The last discussed process, which can be generally designated as friction-fusion welding or friction welding, has proven to be especially effective with conventional thermoplastic strap materials such as nylon, polyester, and polypropylene. Such conventional strap is typically provided commercially in widths ranging from about 5 mm. to about 13 mm. and in thicknesses ranging between about 0.25 mm. and about 0.89 mm.

Conventionally produced welded joints in thermoplastic strap have found wide commercial acceptance in many applications. However, a conventional welded joint is typically the weakest part of a tensioned strap loop secured about a package or other object. There is a continuing need for an improved welded joint that has greater strength than conventional welded joints in various types of strap and that can be produced routinely and consistently, and in an economic manner. It would be desirable to produce a welded joint that has a strength that approaches, as close as possible, the tensile strength of the strap.

One aspect of the present invention relates to the provision of a novel strap structure which can be fabricated with certain materials so that when overlapping portions of the strap are welded together, there is produced a welded joint with a unique internal configuration having greater strength.

The above-referenced U.S. patent application Ser. No. 871,693 discloses, inter alia, a welded joint at an interface in overlapping portions of thermoplastic strap wherein the weld is formed by first fusing (melting or liquifying under the application of heat) at least part of the thickness of each strap portion across the width of the interface and then permitting the fused parts of the strap portions to subsequently solidify to form the welded joint.

The weld is created with a selected strap material in a manner such that cavities are encapsulated within the resolidified region of the weld, and the cavities result in the weld having a greater strength. The weld is described in detail in the U.S. Pat. No. 4,707,390 which is assigned to the assignee of the present invention and which is incorporated herein by reference thereto to the extent not inconsistent herewith.

The above-referenced U.S. Pat. No. 4,707,390 and patent application Ser. No. 871,693 each state that the exact mechanism by which the cavities increase the weld strength is not necessarily fully or accurately understood, but nevertheless propose a theory. In particular, it is believed that the improved joint strength of the weld results from the redistribution of stresses within the weld, and that the cavities cause the stress redistribution. It is believed that welds fail when cracks form at the ends of the weld. The cavities are believed to reduce the stresses at a crack tip that is propagating into one or more of the cavities.

The above-referenced U.S. patent application further states that the cavities are thought to result from material in the strap, such as moisture, which forms gaseous bubbles in the molten weld region. The patent application suggests that such material might be added to the weld region environment before or during welding. In particular, the patent application includes the following disclosure:

"It has also been proposed to add such bubble-producing material directly to the surface of strap that does not normally contain such material. For example, conventional polypropylene strap does not hold moisture in amounts sufficient to form bubbles when the strap is welded in accordance with the present invention. However, a layer of a bubble-forming material could be coextruded on each surface of polypropylene strap. Such a layer could be a polyester strap material that normally contains amounts of moisture believed to be sufficient to generate the bubbles during the welding process."

The present invention relates to such additive materials and additional layers of materials which may be incorporated in a strap. Disclosed herein are particular strap structures and additive materials which will facilitate the formation of a strap weld containing encapsulated cavities. The cavities may be alternatively or more broadly characterized as discrete volumes in the resolidified region wherein such discrete volumes could include, but are not limited to including, gaseous bubbles.

SUMMARY OF THE INVENTION

An improved thermoplastic strap weld and improved thermoplastic strapping are provided according to the present invention, and the strapping facilitates the improved welding together of overlapping portions of the strapping arranged in a face-to-face relationship. The welded joint includes at least a part of the thickness of each strap portion merged together to form a resolidified region from a fused state after application of heat to the strap portions in an initial solid state.

The resolidified region includes a first material and includes a plurality of discreet volumes from which the first material is absent and which are distributed in the first material across the width and thickness of the resolidified region at least adjacent each end of the resolidifed region.

The strap is initially provided, prior to the weld formation, with at least a first layer including he first material. The strap is also initially provided with a second material for effecting the creation of the plurality of discreet volumes in the resolidified region as a result of application of heat and subsequent resolidification.

In one embodiment, the second material is present on at least one side surface of the first material layer, and the second material defines a second layer carried on the first material layer. An example of the first material is polypropylene or polyethylene terephthalate. An example of the second material is polyethylene terephthalate having an intrinsic viscosity of about 1.0.

In another embodiment, the second material is dispersed as an additive in the first material layer and has a greater concentration at least at one side surface of the first material layer. The additive second material may be a foaming agent material such as a 5-phenyltetrazole compound or a toluenesulfonyl semicarbicide compound.

In another embodiment, the second material may disperse to form separate globules which occupy the discreet volumes. Such a second material may be the combination of polyisobutylene dispersed in a layer of polypropylene which in turn is carried on the first material layer.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same.

DESCRIPTION OF THE PREFERRED EMBODIMENTS

This specification and the accompanying drawings disclose only some specific forms as examples of the invention. The invention is not intended to be limited to the embodiments so described, and the scope of the invention will be pointed out in the appended claims.

FIGS. 5–8 illustrating embodiments of an apparatus for producing the welded joint of the present invention show structural details and mechanical elements that will be recognized by one skilled in the art. However, the detailed descriptions of such elements are not necessary to an understanding of the invention, and accordingly, are not herein presented.

Figure 1:
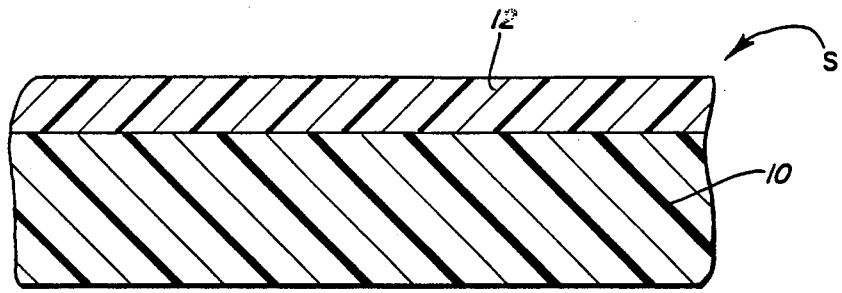
FIG. 1 is a fragmentary, cross-sectional view (not to scale) of a first embodiment of a strap of the present invention.

A first embodiment of the strapping structure of the present invention is illustrated in FIG. 1 and is designated therein generally by the reference letter S. The strapping S, which may be provided in the form of a single length of strap for being disposed in a loop around an article, has at least a first layer that includes a first material 10. The first material 10 has the flexibility, strength, abrasion resistance, and compositional stability, among other characteristics, that would be suitable for use as strap in the particular application for which it is intended.

Conventional thermoplastic strap or strapping materials 10 which may be used include nylon, polypropylene, and polyethylene terephthalate. Straps formed from such materials may be fabricated by generally similar techniques, as is disclosed, for example, in U.S. Pat. No. 3,394,045 relating to polypropylene strapping.

Conventional strapping materials are commercially available from various entities around the world, included in the United States of America. For example, polyethylene terephthalate strap is sold in the United States of America under the product designation "TE-NAX" by Signode Corporation, 3600 West Lake Avenue, Glenview, Ill. 60025, U.S.A.

The strapping S includes a second material 12 carried by the first material 10. The second material 12 effects the creation, in the first material, of a plurality of cavities or discrete volumes in the region of the weld when overlapping portions of the strap S are welded together as illustrated in FIG. 4.

Figure 4:
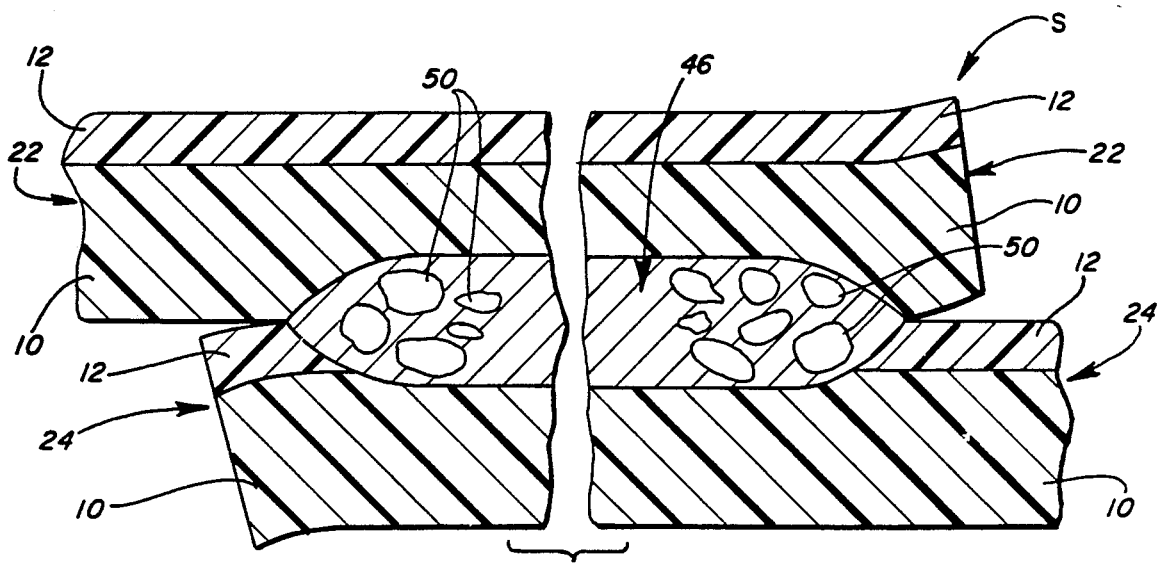
FIG. 4 is a fragmentary, cross-sectional view (not to scale) of a welded joint between overlapping end portions of the first embodiment of the strap of the present invention illustrated in FIG. 1.

Specifically, FIG. 4 illustrates an upper strap portion 22 of the strap S in a face-to-face relationship at a welded joint 46 with a lower portion 24 of the strap S. A part of the thickness of each strap portion 22 and 24 forms a resolidified region which constitutes the weld 46. The part of the thickness of each strap portion 22 and 24 that forms the weld 46 is resolidified from a fused state after application of heat to the strap portions 22 and 24 in an initial solid state.

The resolidified region weld 46 includes a solidified phase of the first material 10 and a plurality of cavities or discrete volumes 50 defined in the resolidified region from which the first material 10 is absent and which are distributed in the first material 10 across the width and thickness of the resolidified region at least adjacent each end of the resolidified region.

In the first embodiment of the strapping S illustrated in FIG. 1, the second material 12 is initially provided as a second layer on one side surface of the first material layer. The second layer (i.e., the second material 12) may be applied by any suitable process, such as heat seal bonding. In another process, the first layer material 10 and second layer material 12 may be coextruded to form the strapping S.

The second material 12 may be a material that is in the form of globules per se or that disperses to form separate globules in the fused state. These globules may be characterized as being, defining, or occupying the discrete volumes 50, and these globules or volumes 50 then become encapsulated in the weld 46 upon resolidification of the material in the weld 46.

For example, the second material 12 may be the combination of polyisobutylene dispersed in a layer of polypropylene which in turn is carried on the first material layer. During the welding process, this will form discrete volumes of globules 50 in the weld, and the weld will solidify to encapsulate the globules.

The second material 12 may also be a particulate foaming agent which expands as a result of the application of heat to create the plurality of discrete volumes 50 in the form of cavities which become encapsulated in the first material 10 upon subsequent resolidification in the resolidified weld 46. Such a particulate foaming agent may include a 5-phenyltetrazole compound such as that sold by Olin Corporation, Chemicals Group, 120 Long Ridge Road, Stanford, Conn. 06904 U.S.A. under the tradename EXPANDEX 05 PT. Another foaming agent that may be included in the second material 12 is the toluenesulfonyl semicarbicide compound sold by Uniroyal Company, Chemicals Group, Middlebury, Conn. 06749 under the tradename CELOGEN RA.

The second material 12 may also be composed entirely of polyethylene terephthalate having an intrinsic viscosity between about 0.6 and about 1.0. If the second material 12 is such a layer of polyethylene terephthalate, then, under the application of heat during the welding process, cavities 50 are formed, and it is believed that such cavities 50 result from the release of water vapor from the polyethylene terephthalate.

The second material 12 may also contain pre-formed cavities (not shown in FIG. 1) which ultimately occupy the plurality of discrete volumes 50 (FIG. 4) and become encapsulated in the first material 10 upon application of heat and subsequent resolidification in the resolidified region or weld 46.

Figure 2:
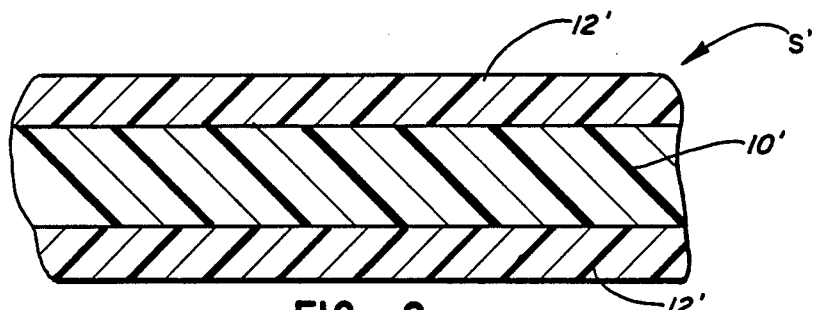
FIG. 2 is a fragmentary, cross-sectional view (not to scale) of a second embodiment of the strap of the present invention.

A second embodiment of the strapping structure of the present invention is illustrated in FIG. 2 and is designated generally therein by the reference letter S'. The strapping includes a first layer of a first material 10' and a second material 12' which is initially present on each of two oppositely facing side surfaces of the layer of first material 10'. The materials 10' and 12' may include the compositions discussed above with respect to the first and second materials 10 and 12, respectively.

Figure 3:
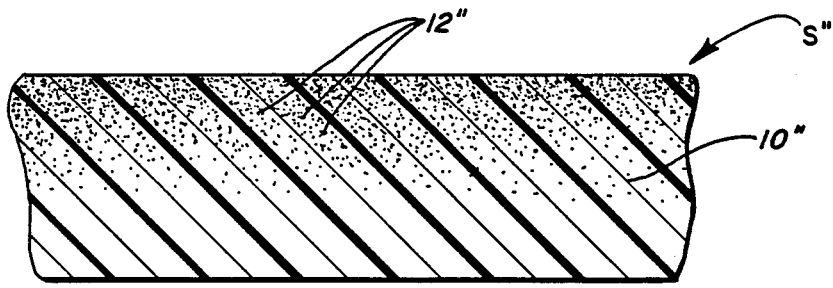
FIG. 3 is a fragmentary, cross-sectional view (not to scale) of a third embodiment of the strap of the present invention.

A third embodiment of the strapping structure of the present invention is illustrated in FIG. 3 and is designated generally therein by the reference letter S''. The strapping S'' includes a layer of at least a first material 10''.

A second material 12'' is dispersed in the first material 10''. The second material 12'' is a particulate material which, as a result of the application of heat during strap welding, occupies the plurality of discrete volumes 50 (FIG. 4) which become encapsulated in the first material 10'' upon subsequent resolidification in the resolidified region or weld 46. The second material 12'' may be a particulate foaming agent, such as those discussed above with reference to FIG. 1. The particulate second material 12'' may, as in the embodiment illustrated in FIG. 3, be dispersed as an additive in the first material layer 10'' so that it is more concentrated at one side surface of the first material layer 10''.

With reference to the completed weld 46 shown in FIG. 4, the cavities or discrete volumes 50 are dispersed generally across the width of the strap weld 46. In the preferred embodiment illustrated, the volumes 50 are preferably somewhat concentrated toward each longitudinal end of the weld 46 (although the volumes 50 need not be located precisely at the distal ends of the weld 46).

It is believed that when portions of such strap are melted, the discrete volumes or cavities 50 produced by, or contained in, the strapping material tends to be forced to some extent outwardly toward the edges and ends of the weld 46. If the welding pressure is terminated while the strap portions are still molten and before all of the volumes or cavities 50 have been squeezed out of the weld area, the remaining volumes or cavities 50 become encapsulated within the solidifying strap material.

The exact mechanism by which the volumes 50 are maintained in the weld is not necessarily fully understood, and there is no intent herein to be bound by any theory or by any explanation as provided above. The number, size, and distribution of the cavities or discrete volumes 50 in a particular weld having improved strength according to this invention can vary and may depend, to some extent, on the width and thickness of the strap and weld.

The nominal thickness of each strap portion 22 and 24 may be, for example, 0.5 mm., and the width of each strap portion may be 11 mm. The completed weld may be about 19 mm. along the length of each strap portion. The joint weld thickness at the interface of two such overlapping strap portions may typically range, for example, between about 0.06 mm. and about 0.15 mm.

It is to be noted that most of the cavities 50 visible along the planar longitudinal cross-section in FIG. 4 do not present a circular profile. Although not illustrated, the profiles of most of the cavities 50 when viewed in plan (perpendicular to the plane of FIG. 4) similarly do not appear as perfect circles. Thus, most of the cavities 50 do not have precisely spherical configurations. Rather, most of the cavities 50 each have a volumetric configuration that is irregular. However, the cavities 50 may also have a spherical shape or some other shape.

It is to be realized that the longitudinal cross-section of the joint weld illustrated in FIG. 4 is taken at one selected plane along the length of the weld. Other longitudinal cross-sectional views, if taken along parallel planes throughout the width of the joint, would show analogous cavity distributions, cavity sizes, and cavity shapes. The concentration of cavities at any point along the length of the longitudinal cross-section would typically be substantially constant across the width of the welded joint at that point.

The form of the specific welded joint embodiment illustrated in FIG. 4 may be more particularly characterized by describing the distribution of the cavities 50 along the planar longitudinal cross-section of the joint. To this end, the joint resolidified region can be characterized as including an end portion at one end, an end portion at the other end, and a central portion defined between the two end portions.

Most of the cavities 50 may be concentrated in the two end portions where each end portion is defined in this weld as comprising about 30% of the length of the resolidified region and where the central portion (broken away in FIG. 4) is defined as comprising about 40% of the length of the resolidified region intermediate the end portions).

For the particular example joint weld illustrated in FIG. 4, the concentration of cavities 50 in the central portion could be very low compared to the concentration of the cavities 50 in the end portions. There may be very few cavities of significant size in the central portion. A planar longitudinal cross-section of the central portion may intersect very few cavities that have a major dimension greater than 25% of the joint resolidified region thickness as measured at the cavity location. On the other hand, the planar longitudinal cross-section in either of the end portions may intersect many more than cavities that each have a major dimension greater than 25% of the joint resolidified region thickness as measured at the cavity location.

It should also be noted that many of the cavities in the end portions are relatively large compared to the thickness of the resolidified region. For example, the planar longitudinal cross-section in either of the end portions may intersect a substantial number of cavities that each have a major dimension greater than 25% or even 50% of the joint resolidified region thickness at the cavity location.

Typically, the welded joint solidified region thickness would be a maximum at each end portion of the joint— where the encapsulated cavities 50 are preferably most highly concentrated and preferably have the largest dimensions.

Each end portion may be further characterized as including an outer portion extending from an end of the joint inwardly for a distance (e.g., equal to about 4–5% of the length of the resolidified region). The total volume of the cavities 50 in each outer portion may be substantially less than the total volume of the cavities in the remainder of the associated end portion.

Figure 5:
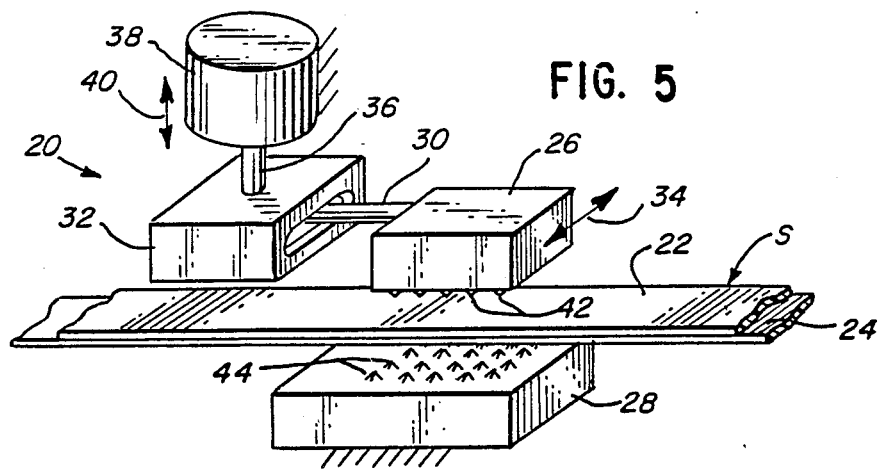
FIG. 5 is a simplified, substantially schematic, perspective view of the strap of FIG. 1 disposed with overlapping end portions arranged in a face-to-face relationship in one form of an apparatus which is capable of producing an improved welded joint of the present invention (it being realized that the size of the strap illustrated in this FIG. 5 and in the other Figures has been exaggerated in relationship to the apparatus components so that this relationship is not to scale and so that certain details may be more clearly illustrated)
Figure 6:
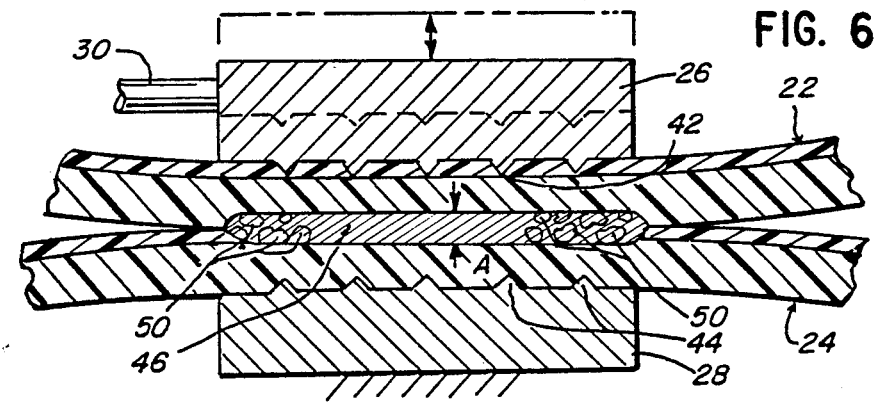
FIG. 6 is a greatly enlarged, fragmentary, cross-sectional view of a portion of the apparatus in FIG. 5, but with the apparatus shown engaging overlapping strap portions while forming therebetween a welded joint (which is not shown to scale)

One form of a method for producing the improved joint of the present invention is illustrated in FIGS. 5 and 6 wherein the apparatus is schematically represented and is designated generally by reference numeral 20. The apparatus 20 is intended for producing a welded joint between two overlapping portions of the thermoplastic strap S (or, S' or S) comprising the above-discussed first and second materials and having an upper strap portion 22 and a lower strap portion 24.

The apparatus 20 includes two strap-engaging members, an upper, moveable strap-engaging member 26, and a lower, fixed strap-engaging member 28. Alternatively, the moveable member 26 may be located on the bottom and the fixed member 28 may be located on the top. Also, both members 26 and 28 may be moveable.

Upper member 26 is mounted to a drive rod 30 which is carried in a drive mechanism 32 for moving the rod 30, and hence the upper strap-engaging member 26, in a horizontal direction. Although a variety of motions may be used, in the illustrated embodiment, the motion is one of oscillation or reciprocation. The motion is generally transverse to the length of the strap S (in the directions indicated by the double-headed arrow 34).

The oscillator drive mechanism 32 is mounted to a rod 36 carried in an actuator mechanism 38 disposed at a fixed location. The actuator 38 is effective to move the oscillator drive mechanism 32 and the connected strap-engaging member 26 upwardly or downwardly in the directions indicated by the double-headed arrow 40.

The actuator 38 can be regarded as functioning as a closing means for effecting relative movement between the two strap-engaging members 26 and 28 for pressing the strap portions together. The same actuator 38 can also be regarded as an opening means for effecting relative movement between the members 26 and 28 to subsequently release the pressure on the strap portions. However, it is to be realized that, in an alternate embodiment (not illustrated), member 28 could also be moveable and that, if desired, a separate opening mechanism (e.g., actuator) could then be employed with the member 28 to move it away from the member 26 to release the pressure.

The actuator 38 may be of any suitable type, such as a hydraulic or pneumatic actuator, an electric motor, a cam device, or the like. Similarly, the oscillator drive mechanism 32 may include suitable conventional systems for effecting oscillation of the strap-engaging member 26. For example, an electric motor and coupled eccentric drive system maybe provided as part of the mechanism 32.

Preferably, the bottom surface of the strap-engaging member 26 is roughened or has teeth 42, and the upper surface of the strap-engaging member 28 is also roughened or has teeth 44. It is desired that the strap portions 22 and 24 be contacted by the strap-engaging members 26 and 28, respectively, so that relative oscillation movement of one or both of the strap-engaging members will cause the strap portions to be oscillated with the contacting strap-engaging members and relative to each other.

FIG. 6 illustrates the upper strap-engaging member 26 moved downwardly to press the overlapping strap portions into face-to-face contact under pressure at the strap interface. The upper strap-engaging member 26 may be oscillating prior to, as well as during, contact with the upper strap portion 22. Alternatively, the member 26 may be oscillated only after forcing the upper strap portion 22 into contact with the lower strap portion 24.

In any case, relative bodily sliding movement is effected between the two strap portions 22 and 24, and at least part of the thickness of each strap portion fuses (i.e., liquifies or melts) at the interface. The melted parts of the strap portions merge and then subsequently resolidify to form the welded joint or weld that is generally designated by reference numeral 46. The nominal thickness of the weld 46 is indicated generally by the reference letter A in FIG. 6. It is to be noted that the oscillator drive mechanism 32, operating with through the strap-engaging member 26, functions as a means for increasing the energy in the strap portions at the interface sufficiently to melt at least part of the thickness of each strap portion.

If the strap includes one of the previously discussed types of material that forms or generates the cavities or discrete volumes 50 under the application of heat for a period of time, then the apparatus 20 must be operated as necessary to produce such heat. The energy in the strap portions is increased in such a manner so as to not only melt at least part of the thickness of each strap portion, but so as to be sufficient to create the plurality of discrete volumes 50 within the molten parts of the strap portions across the width of the interface. Subsequently, the step of increasing the energy in the strap portions (e.g., the step of effecting relative oscillation) is terminated, and the strap portions at the interface subsequently solidify to encapsulate the cavities 50 and form the welded joint.

If the strap includes one of the previously discussed types of material that contains, or is defined by, preformed cavities or discrete volumes 50, then the apparatus 20 is operated as necessary to melt at least part of the thickness of each strap portion such that the melted parts contain a distribution of the cavities or volumes 50 which remain encapsulated therein upon subsequent resolidification.

In one way of operating of the apparatus 20, the welding pressure is released while the strap portions are still molten. Although this early release of pressure is contrary to conventional practice and teachings, it has an advantage, in friction-fusion welding, that the cooling and solidifying strap portions will not be disturbed by the vibratory member as its vibration amplitude is damped to zero upon termination of the welding step. To this end, the oscillating strap-engaging member 26 is preferably disengaged from the strap portion 22 to release the welding pressure while the strap portions are still molten.

Figure 7:
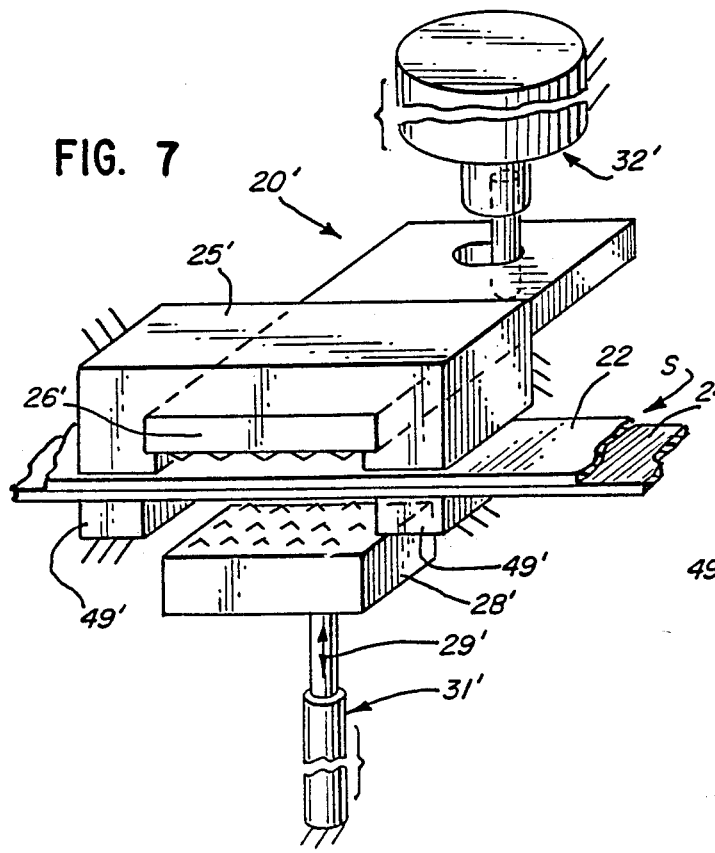
FIG. 7 is a simplified, substantially schematic, perspective view of a second embodiment of the apparatus.
Figure 8:
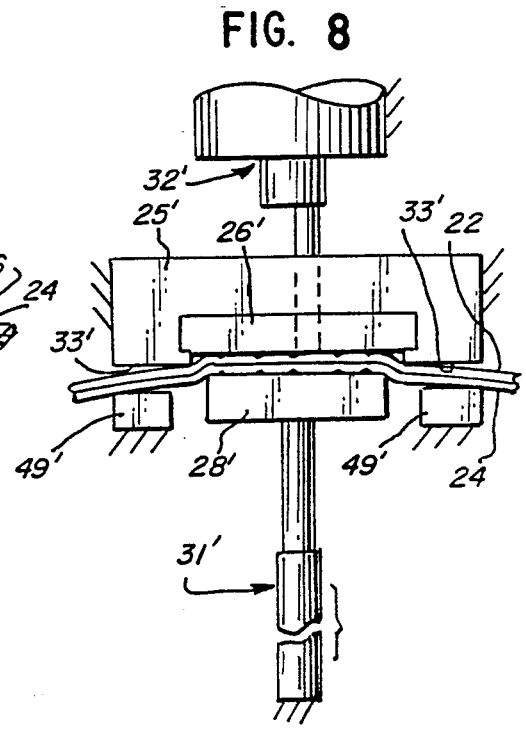
FIG. 8 is a fragmentary, side elevational view of a portion of the second embodiment of the apparatus but with the apparatus shown engaging overlapping strap portions while forming a welded joint therebetween.

FIGS. 7 and 8 illustrate an alternate embodiment of the apparatus for producing the improved joint of the present invention, and the alternate embodiment apparatus is designated generally by the reference numeral 20' in FIG. 7. The apparatus 20' includes two fixed members 49' for supporting the overlapping strap portions 22 and 24. The members 49' are spaced apart to accommodate the movement of a lower strap-engaging member 28' toward and away from the strap portions. The strap-engaging member 28' is moved upwardly or downwardly, in the directions indicated by the double-headed arrow 29', by a suitable mechanism, such as a conventional cam or pneumatic actuator 31'.

The apparatus 20' includes an upper guide block 25' for receiving an upper strap-engaging member 26'. The member 26' is slidably disposed within the guide block 25' and is operably reciprocated transversely of the strap length by a suitable eccentric drive mechanism 32'.

It is to be noted that the bottom surface of the upper strap-engaging member 26' is recessed somewhat above the downwardly facing end surfaces 33' of the guide block 25'. Thus, when the lower strap-engaging member 28' is in the downwardly retracted position away from the strap portions, the strap portions will extend across the guide block 25' out of contact with the upper strap-engaging member 26' owing to the influence of gravity, or inherent strap stiffness, or strap tension, if any.

When it is desired to weld the strap portions together, the lower strap-engaging member 28' is elevated as illustrated in FIG. 8 to press the strap portions against the recessed, upper strap-engaging member 26' which is reciprocated by the eccentric drive 32'.

The welding pressure can then be immediately released while the strap portions are still molten. To this end, the lower strap-engaging member 28' is lowered, and the strap portions 22 and 24, under the influence of gravity, strap tension, and/or their inherent stiffness, move away from the recessed vibrating strap-engaging member 26'. Typically, if this method is effected on overlapping strap portions in a tensioned strap loop, the tension in the strap will aid in quickly pulling the overlapping strap portions away from the strap-engaging member 26' and into the substantially straight configuration illustrated in FIG. 7.

Another preferred embodiment of the apparatus which may be used for producing an improved welded joint in strapping of the present invention is disclosed in detail in the above-discussed U.S. Pat. No. 4,707,390 wherein the apparatus is shown in FIGS. 5–21 as being incorporated in an automatic strapping machine. In any event, the particular apparatus for welding the strapping forms no part of the present strapping product invention or weld product invention.

It will be readily observed from the foregoing detailed description of the invention and from the illustrated embodiments thereof that variations and modifications may be effected without departing from the true spirit and scope of the novel concepts or principles of this invention.

What is claimed is:

1. A welded joint between two overlapping portions of thermoplastic strap arranged in a face-to-face relationship at said welded joint wherein said strap includes a first material defining a layer and a second material carried by said first material with said second material including a non-atmospheric, non-aqueous, particulate foaming agent which foams as a result of application of heat, said welded joint comprising:
    at least part of the thickness of each said strap portion forming a resolidified region from a fused state after application of heat to said strap portions in an initial solid state, said resolidified region containing a plurality of cavities at least adjacent each end of said resolidified region, said cavities being defined by the encapsulation of the foam resulting from said foaming agent during application of the heat of welding.

2. The joint in accordance with claim 1 in which said joint is produced from said strap initially fabricated with said second material deposited in a discrete layer on said first material.

3. A welded joint between two overlapping portions of thermoplastic strap arranged in a face-to-face relationship at said welded joint wherein said strap includes a first material defining a first layer and a second material defining a second layer on and coextruded with said first layer of said first material, said welded joint comprising:
    at least part of the thickness of each said strap portion forming a resolidified region from a fused state after application of heat to said strap portions in an initial solid state, at least part of said resolidified region being formed in said coextruded second layer of said second material, said second material being different from said first material, a plurality of discrete volumes created by said second material in said resolidified region and from which said first material is absent, said plurality of discrete volumes being formed as a result of said application of heat during welding, said discrete volumes being encapsulated in said resolidified region at least adjacent each end of said resolidified region.

4. The joint in accordance with claims 1 or 3 in which each said end portion comprises about 30% of the length of said resolidified region and said central portion comprises about 40% of the length of said resolidified region.

5. The joint in accordance with claim 3 in which said resolidified region includes an end portion at one end, an end portion at the other end, and a central portion defined between the two end portions, and in which a majority of said discrete volumes are encapsulated cavities of gas located in said end portions.

6. The joint in accordance with claim 3 in which at least some of said cavities contained in said end portions have major dimensions greater than 25% of the joint resolidified region thickness as measured at the cavity location.

7. The joint in accordance with claim 3 in which at least some of said discrete volumes in said end portions have major dimensions greater than 50% of the joint resolidified region thickness at the cavity location.

8. The joint in accordance with claim 3 in which said discrete volumes are occupied by globules of said second material.

* * * * *